US011259357B2

(12) United States Patent
Wang et al.

(10) Patent No.: US 11,259,357 B2
(45) Date of Patent: Feb. 22, 2022

(54) MANAGEMENT OF DISCONTINUOUS RECEPTION (DRX) FOR A TERMINAL HAVING A VOICE SERVICE

(71) Applicant: Huawei Technologies Co., Ltd., Shenzhen (CN)

(72) Inventors: Zhendong Wang, Shanghai (CN); Lianfang Wu, Shanghai (CN); Yinghua Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/510,540

(22) Filed: Jul. 12, 2019

(65) Prior Publication Data

US 2019/0335531 A1 Oct. 31, 2019

Related U.S. Application Data

(63) Continuation of application No. PCT/CN2017/071193, filed on Jan. 14, 2017.

(51) Int. Cl.
*H04W 76/28* (2018.01)
*H04W 76/27* (2018.01)
*H04W 4/16* (2009.01)
*H04W 68/00* (2009.01)

(52) U.S. Cl.
CPC ............ *H04W 76/28* (2018.02); *H04W 4/16* (2013.01); *H04W 68/005* (2013.01); *H04W 76/27* (2018.02)

(58) Field of Classification Search
CPC ....... H04W 76/28; H04W 76/27; H04W 4/16; H04W 68/005
See application file for complete search history.

(56) References Cited

U.S. PATENT DOCUMENTS

| 2012/0046030 A1 | 2/2012 | Siomina et al. |
| 2012/0120843 A1 | 5/2012 | Anderson et al. |
| 2015/0092707 A1* | 4/2015 | Kwon ................... H04L 5/0098 370/329 |

(Continued)

FOREIGN PATENT DOCUMENTS

| CN | 103314633 A | 9/2013 |
| CN | 104039027 A | 9/2014 |

(Continued)

OTHER PUBLICATIONS

WO 2017086717 A1 (Year: 2017).*

(Continued)

*Primary Examiner* — Ian N Moore
*Assistant Examiner* — Rushil Parimal Sampat
(74) *Attorney, Agent, or Firm* — Slater Matsil, LLP

(57) ABSTRACT

Embodiments of this application provide a discontinuous reception DRX management method, including determining, by a base station, that a terminal has a voice service, and setting up, by the base station, a voice bearer for the terminal, and activating a DRX function of the terminal when setting up the voice bearer for the terminal. It can be learned that, in the method, the terminal does not activate the DRX function before setting up the voice bearer, and does not activate the DRX function until the voice bearer is set up, to effectively reduce a voice paging connection delay.

20 Claims, 9 Drawing Sheets

(56) References Cited

U.S. PATENT DOCUMENTS

| | | | |
|---|---|---|---|
| 2015/0117287 A1* | 4/2015 | Kim | H04W 52/0241 370/311 |
| 2015/0282083 A1* | 10/2015 | Jeong | H04W 52/0225 370/311 |
| 2015/0341858 A1* | 11/2015 | Hwang | H04L 1/1657 370/311 |
| 2015/0358477 A1* | 12/2015 | Jeong | H04M 15/8016 370/259 |
| 2016/0174188 A1 | 6/2016 | Kim et al. | |
| 2016/0183156 A1* | 6/2016 | Chin | H04L 61/2007 370/331 |
| 2017/0295608 A1 | 10/2017 | Li et al. | |
| 2018/0270873 A1* | 9/2018 | Cho | H04W 76/10 |
| 2019/0342940 A1* | 11/2019 | Ryu | H04W 8/02 |

FOREIGN PATENT DOCUMENTS

| | | |
|---|---|---|
| CN | 105813177 A | 7/2016 |
| EP | 2944128 B1 | 7/2016 |
| JP | 2014068260 A | 4/2014 |
| JP | 2016527822 A | 9/2016 |
| JP | 2018502510 A | 1/2018 |
| KR | 20160045076 A | 4/2016 |
| KR | 101682004 B1 | 12/2016 |
| WO | 2016101857 A1 | 6/2016 |

OTHER PUBLICATIONS

3rd Generation Partnership Project; Technical Specification Group Services and System Aspects; 3GPP System Architecture Evolution (SAE); Security architecture (Release 14), 3GPP TS 33.401 V14.1.0, Dec. 2016, 152 pages.

3rd Generation Partnership Project; Technical Specification Group Radio Access Network; Evolved Universal Terrestrial Radio Access Network (E-UTRAN); S1 Application Protocol (S1AP) (Release 14), 3GPP TS 36.413 V14.1.0, Jan. 2017, 333 pages.

* cited by examiner

MANAGEMENT OF DISCONTINUOUS RECEPTION (DRX) FOR A TERMINAL HAVING A VOICE SERVICE

CROSS-REFERENCE TO RELATED APPLICATIONS

This application is a continuation of International Application No. PCT/CN2017/071193, filed on Jan. 14, 2017, the disclosure of which is hereby incorporated herein by reference in its entirety.

TECHNICAL FIELD

Embodiments of this application relate to the field of communications technologies, and more specifically, to a discontinuous reception management method and apparatus.

BACKGROUND

Different communications networks have different bearer mechanisms for a voice service. For example, in the second generation mobile communications technology or third generation mobile communications technology network, a voice service is carried in circuit switched (CS) domain. For another example, in a Long Term Evolution (LTE) system, a voice service is carried in packet switched (PS) domain. The voice service is packetized, like other service data, into an Internet Protocol (IP) data packet for transmission, thereby implementing end-to-end voice communication. Compared with a CS domain network, a PS domain network can provide a user with a faster voice service of higher quality.

A service data flow usually has a burst characteristic: There is data transmission in a period of time, but there is no data transmission in a next period of time. Based on this, a discontinuous reception (DRX) mechanism is introduced, to reduce energy consumption of a terminal. In the mechanism, the terminal stops listening on a physical downlink control channel (PDCCH) in a period of time (which may be referred to as a dormant period), and listens on the PDCCH only when entering an active state. In this way, the terminal does not need to continuously listen on the PDCCH, thereby reducing energy consumption of the terminal.

However, in a voice call process, introduction of the DRX technology increases a voice call connection delay, deteriorating user experience.

SUMMARY

In view of this, embodiments of this application provide a DRX management method and apparatus, to reduce a voice call connection delay.

According to a first aspect, a DRX management method is provided, including: determining, by a base station, that a terminal has a voice service, and setting up, by the base station, a voice bearer for the terminal, and activating a DRX function of the terminal when setting up the voice bearer for the terminal.

It can be learned that the terminal does not activate the DRX function before setting up the voice bearer, and does not activate the DRX function until the voice bearer is set up, thereby reducing a voice call connection delay.

The activating means that the DRX function of the terminal is not enabled before the voice bearer is set up, and is enabled only when the voice bearer is set up. For example, the base station does not activate the DRX function of the terminal when setting up a default bearer, and sends a DRX parameter until the voice bearer is set up, to activate the DRX function of the terminal. Alternatively, when the DRX function of the terminal has been enabled before the voice bearer is set up, the base station deconfigures the DRX function of the terminal to disable the DRX function of the terminal, and sends the DRX parameter until the voice bearer is set up, to activate the DRX function of the terminal. Deactivating means that when the DRX function of the terminal has been enabled before the voice bearer is set up, the base station deconfigures the DRX function of the terminal to disable the DRX function of the terminal.

Optionally, before the setting up, by the base station, a voice bearer for the terminal, the method further includes: setting up, by the base station, a default bearer for the terminal, and skipping activating the DRX function of the terminal when setting up the default bearer for the terminal.

Optionally, when the base station has activated the DRX function of the terminal before the base station sets up the voice bearer for the terminal, the method further includes: sending, by the base station, a message for deactivating the DRX function of the terminal to the terminal. That the base station activates the DRX function of the terminal may be implemented by adding, in an RRC connection reconfiguration process, the DRX parameter to an RRC connection reconfiguration message to be sent to the terminal. Because the DRX function of the terminal is not activated when the RRC connection reconfiguration message is sent, sending and reception of the RRC connection reconfiguration message are not affected by the DRX function, ensuring low-delay setup of the voice bearer, and reducing a voice call connection delay.

That the base station skips activating the DRX function of the terminal when setting up the default bearer for the terminal may be implemented by not adding, in the RRC connection reconfiguration process, the DRX parameter to an RRC connection reconfiguration message to be sent to the terminal.

That the base station sends the message for deactivating the DRX function of the terminal to the terminal may be implemented by adding, in the RRC connection reconfiguration process, a DRX parameter release information element to an RRC connection reconfiguration message to be sent to the terminal.

In the method, the method for determining, by a base station, that a terminal has a voice service may include following manners:

Manner 1: The base station receives an RRC connection request message sent by the terminal, where the RRC connection request message includes a cause value, and the cause value is used to indicate a cause for initiating an RRC connection request, and the base station determines, based on the cause value, that the terminal has a voice service. Further, when the cause value is a voice call mobile originator, such as mo-VoiceCall, the base station determines, based on the cause value, that the terminal has a voice service, and may determine that the terminal is a calling terminal. When the cause value is a voice call mobile terminator, such as mt-VoiceCall, the base station determines, based on the cause value, that the terminal has a voice service, and may determine that the terminal is a called terminal.

Manner 2: The base station determines, based on a paging message, that the terminal has a voice service, and this manner specifically includes: receiving, by the base station, the paging message of the terminal from a core network, where the paging message includes indication information, and the indication information is used to indicate that the terminal has a voice service, and determining, by the base station based on the indication information, that the terminal has a voice service.

The indication information may be a paging priority, and a process of determining, based on the indication information, that the terminal has a voice service includes: when determining that the paging priority is a first paging priority, determining, by the base station, that the terminal has a voice service, where the first paging priority is a specified paging priority used to indicate that the terminal has a voice service. The method can be compatible with an existing protocol, and has relatively high compatibility.

The indication information may be an information element specially used to indicate that the terminal has a voice service, for example, a voice terminal indication information element. In this case, a process of determining, by the base station based on the indication information, that the terminal has a voice service includes: when determining that the paging message includes the voice terminal indication information element, determining, by the base station, that the terminal has a voice service.

Manner 3: The base station determines, based on an initial context setup request message, that the terminal has a voice service, and this manner specifically includes: receiving, by the base station, the initial context setup request message, where the initial context setup request message includes an indication information element, and the indication information element is used to indicate that the terminal has a voice service, and determining, by the base station based on the indication information element, that the terminal has a voice service.

Manner 4: The base station parses information carried on the default bearer, and when determining that the information carried on the default bearer is SIP signaling, determines that the terminal has a voice service.

In Manner 1 to Manner 3, before or when setting up the default bearer, the base station may determine that the terminal has a voice service. Therefore, the base station does not activate the DRX function of the terminal when setting up the default bearer, and activates the DRX function of the terminal when the voice bearer is set up.

Manner 4 can be applied in any voice call scenario, and has a better effect in a scenario in which the terminal in an RRC connected mode initiates a voice service or serves as a voice called party. For example, an RRC connection and a default bearer are set up for the terminal because of a non-voice service, and in this case, the DRX function of the terminal has been activated. When determining that the terminal has a voice service, the base station may deactivate the DRX function of the terminal, and activate the DRX function when setting up the voice bearer, and deliver the DRX parameter.

The foregoing default bearer includes a bearer with a QCI of 5 when the terminal has a voice service, and the voice bearer is a dedicated bearer and includes a bearer with a QCI of 1.

According to a second aspect, a DRX management apparatus is provided, is applied to a base station, and includes units or means for performing the steps of any method in the first aspect.

According to a third aspect, a DRX management apparatus is provided, including a processor and a memory, where the memory is configured to store a program, and the processor invokes the program stored in the memory, to perform any method in the first aspect.

According to a fourth aspect, a DRX management apparatus is provided, including at least one processing element or chip for performing any method in the first aspect.

According to a fifth aspect, a program is provided, and the program is used to perform any method in the first aspect when executed by a processor.

According to a sixth aspect, a computer-readable storage medium is provided, including the program in the fifth aspect.

According to a seventh aspect, a DRX management method is provided, is performed by a terminal, and includes: receiving, by the terminal, a first configuration message sent by a base station, where the first configuration message is used to configure a voice bearer of the terminal, and the first configuration message includes a DRX parameter, and enabling, by the terminal, a DRX function based on the DRX parameter.

Optionally, before receiving the first configuration message sent by the base station, the terminal further receives a second configuration message sent by the base station, where the second configuration message is used to configure a default bearer of the terminal, and the second configuration message does not include the DRX parameter. In this way, the terminal does not enable the DRX function when the default bearer is set up.

Optionally, before the terminal receives the first configuration message sent by the base station, the method further includes: receiving, by the terminal, a second configuration message sent by the base station, where the second configuration message is used to configure a default bearer of the terminal, and the second configuration message includes the DRX parameter, enabling, by the terminal, the DRX function based on the DRX parameter in the second configuration message, receiving, by the terminal, a third configuration message, where the third configuration message is used to deconfigure the DRX function of the terminal, and deconfiguring, by the terminal, the DRX function based on the third configuration message.

In this way, although the terminal enables the DRX function when the default bearer is set up, the terminal disables the DRX function when the base station identifies that the terminal has a voice service, thereby mitigating impact of the DRX function on paging connection.

Optionally, a cause value is carried when the terminal in an idle mode sends an RRC connection request to the base station, where the cause value is used to indicate a cause for initiating the RRC connection request, so that the base station determines, based on the cause value, that the terminal has a voice service. Further, when the terminal is a calling terminal, the cause value is a voice call mobile originator, such as mo-VoiceCall, when the terminal is a called terminal, the cause value is a voice call mobile terminator, such as mt-VoiceCall.

According to an eighth aspect, a DRX management apparatus is provided, is applied to a terminal, and includes units or means for performing the steps of any method in the seventh aspect.

According to a ninth aspect, a DRX management apparatus is provided, including a processor and a memory, where the memory is configured to store a program, and the processor invokes the program stored in the memory, to perform any method in the seventh aspect.

According to a tenth aspect, a DRX management apparatus is provided, including at least one processing element or chip for performing any method in the seventh aspect.

According to an eleventh aspect, a program is provided, and the program is used to perform any method provided in the seventh aspect when executed by a processor.

According to a twelfth aspect, a computer-readable storage medium is provided, including the program in the eleventh aspect.

It can be learned that, according to the DRX management method and apparatus in the embodiments of this application, the terminal may not activate the DRX function before the voice bearer is set up, and activate the DRX function only when the voice bearer is set up, thereby delaying activating the DRX function of the terminal, and effectively reducing a voice paging connection delay.

DETAILED DESCRIPTION OF ILLUSTRATIVE EMBODIMENTS

In the following, some terms in the embodiments of this application are explained, to help persons skilled in the art have a better understanding.

(1) A terminal, also referred to as user equipment (UE), is a device for providing a user with voice and/or data connectivity, for example, a handheld device or an in-vehicle device having a wireless connection function. A common terminal includes, for example, a mobile phone, a tablet computer, a notebook computer, a palmtop computer, a mobile Internet device (MID), or a wearable device such as a smartwatch, a smart band, or a pedometer.

(2) A base station, also referred to as a radio access network (RAN) device, is a device for connecting a terminal to a radio network, and includes but is not limited to: a transmission reception point (TRP), an evolved NodeB (eNB), a radio network controller (RNC), a NodeB (NB), a base station controller (BSC), a base transceiver station (BTS), a home eNodeB (for example, Home evolved NodeB, HeNB, or Home NodeB, HNB), and a baseband unit (BBU). In addition, the base station may further include a Wi-Fi access point AP), and the like.

(3) "A plurality of" means two or more, and another quantifier is similar to this. The term "and/or" describes an association relationship between associated objects and indicates that three relationships may exist. For example, A and/or B may represent the following three cases: Only A exists, both A and B exist, and only B exists. The character "/" generally indicates an "or" relationship between the associated objects.

The following describes the embodiments of this application with reference to the accompanying drawings.

Figure 1:
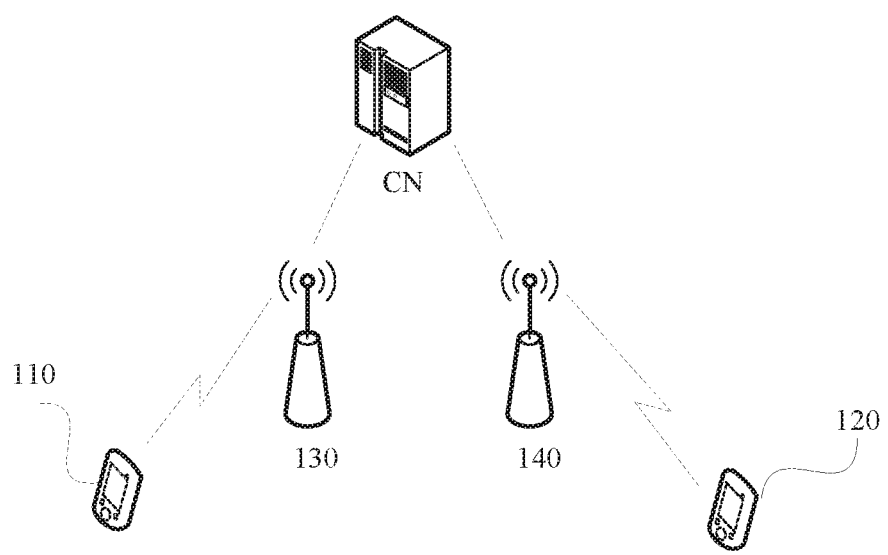
FIG. 1 is a schematic diagram of a voice call scenario according to an embodiment of this application.

FIG. 1 is a schematic diagram of a voice call scenario according to an embodiment of this application. As shown in FIG. 1, a terminal 110 and a terminal 120 access a radio network by using a base station 130 and a base station 140 respectively. The radio network includes an access network and a core network (CN), to obtain a service of an external network (such as the Internet) or communicate with another terminal by using the CN. The base station 130 and the base station 140 are access network devices. For example, the terminal 110 and the terminal 120 access the radio network by using different base stations. The terminal 110 and the terminal 120 can alternatively access the radio network by using a same base station.

The following uses an example in which the terminal 110 is a calling terminal and the terminal 120 is a called terminal, to describe a voice call procedure.

Figure 2A:
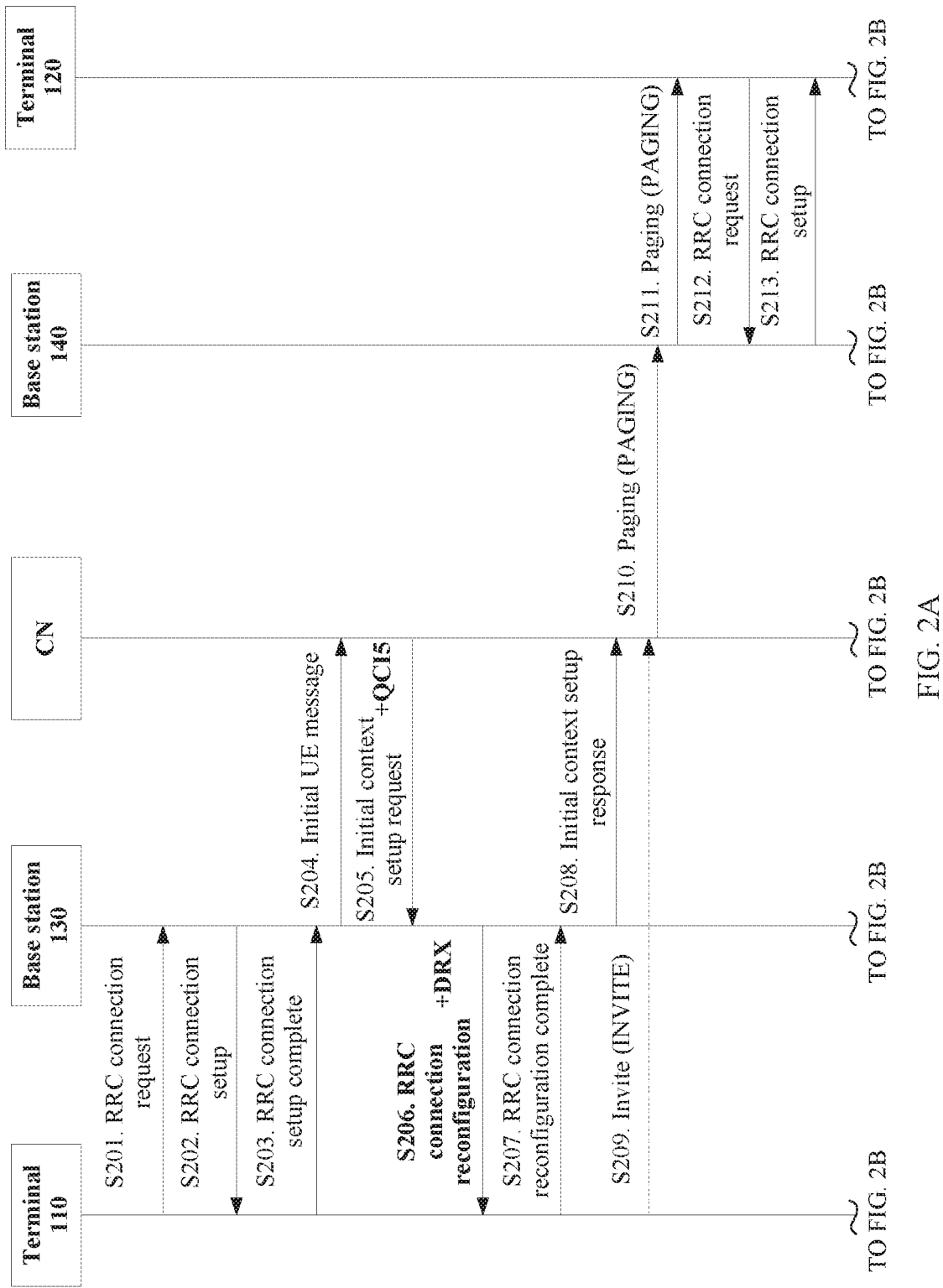
FIG. 2 (consisting of sections 2A and 2B on separate pages) is a schematic diagram of a voice call procedure according to an embodiment of this application.
Figure 2B:
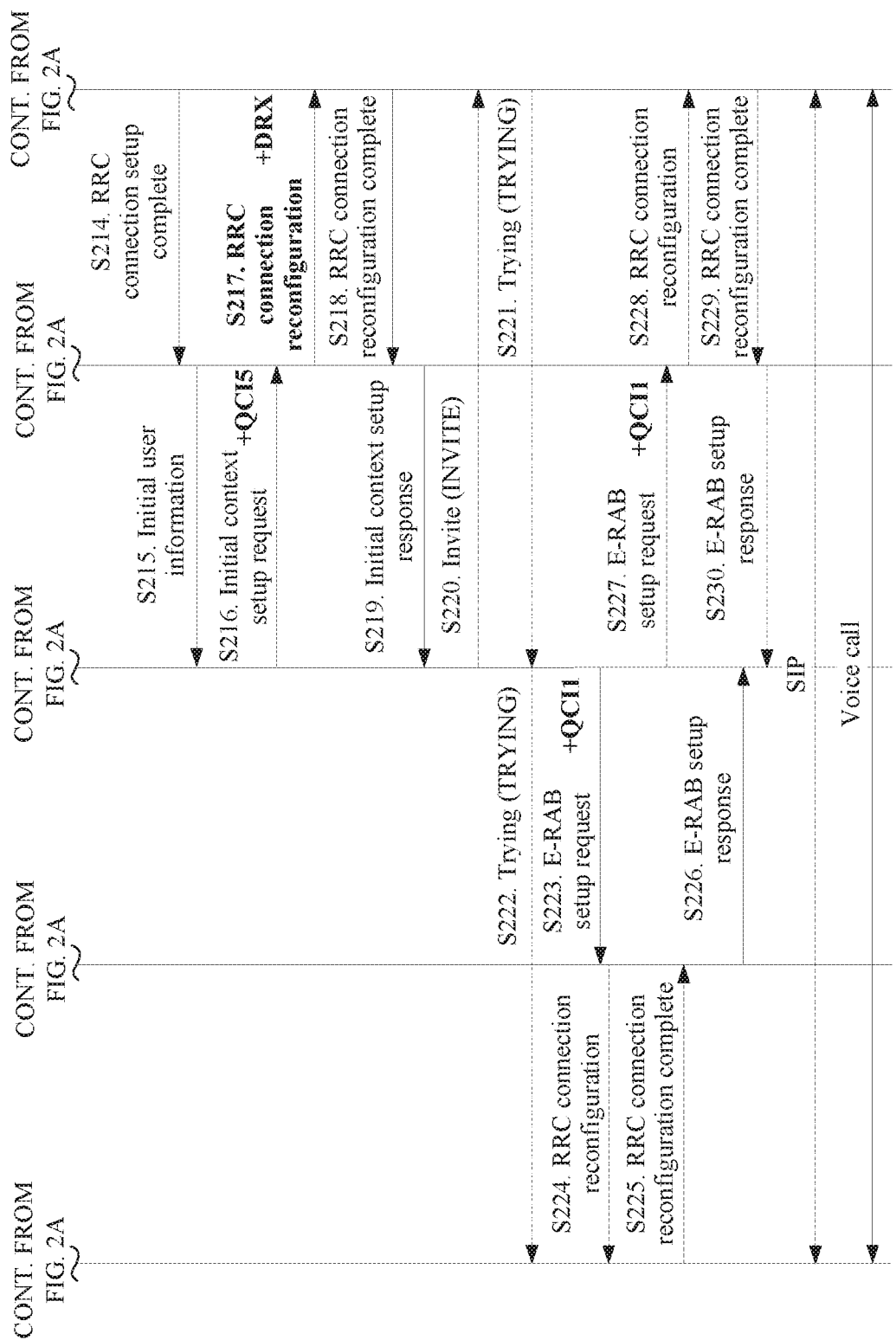

FIG. 2 is a schematic diagram of a voice call procedure according to an embodiment of this application. Herein, that the terminal 110 and the terminal 120 are in an idle mode, and the terminal 110 needs to call the terminal 120 is used as an example for description.

The terminal 110 is in the idle mode, and when needing to call the terminal 120, the terminal 110 first initiates a radio resource control (RRC) connection setup procedure to a serving base station 130 of the terminal 110, to set up an RRC connection to the base station 130. The RRC connection setup procedure is as follows, and is known by persons skilled in the aft. Details are not described.

S201. The terminal 110 sends an RRC connection request message to the base station 130. The base station 130 receives the RRC connection request message sent by the terminal 110, and performs the following step S202:

S202. The base station 130 sends an RRC connection setup message to the terminal 110 in response to the RRC connection request message. The terminal 110 receives the RRC connection setup message and performs the following step S203:

S203. The terminal 110 sends an RRC connection setup complete message to the base station 130. After the base station 130 receives the RRC connection setup complete message sent by the terminal 110, an RRC connection is successfully set up.

The RRC connection request message is used by a terminal to request a base station to set up an RRC connection, and carries a terminal identifier and a setup cause. The base station 130 may know, based on the RRC connection request message, that the terminal 110 is to set up the RRC connection to the base station 130, and the base station 130 configures a signaling radio bearer (SRB) 1 for the terminal 110, and sends configuration information of the SRB1 to the terminal 110 by using the RRC connection setup message. After receiving the RRC connection setup message, the terminal 110 sends an uplink RRC connection setup complete message by using the SRB1, where the uplink RRC connection setup complete message may carry an uplink non-access stratum (NAS) message, for example, may carry a voice service request message because the RRC connection is initiated for a voice service in this embodiment.

After the RRC connection between the terminal 110 and the base station 130 is set up, the base station 130 finds that there is no context of the terminal 110, and therefore sends an initial terminal message (also referred to as an initial UE message, initial UE message) to a CN. After receiving the initial terminal message, the CN sends an initial context setup request message to the base station 130, to set up the context of the terminal 110, as shown in steps S204 and S205:

S204. The base station 130 sends an initial UE message to a CN. The CN receives the initial terminal message sent by the base station 130, and performs the following step S205:

S205. The CN sends an initial context setup request message to the base station 130.

In this process, the CN can instruct the base station 130 to set up a default bearer. An evolved packet system (EPS) bearer includes a default bearer and a dedicated bearer. The default bearer is a bearer meeting a quality of service (QoS) requirement, and is set up when a terminal accesses a network and released when the terminal leaves the network, to provide an online IP transmission service for the terminal accessing the network. The dedicated bearer is a bearer that is set up based on setup of the default bearer, to provide a specific QoS transmission requirement. For example, if an original default bearer cannot meet a QoS requirement of a voice call, a dedicated bearer needs to be set up.

The base station 130 may instruct, by using an RRC connection reconfiguration message, the terminal 110 to set up the default bearer. In this case, a DRX parameter may be configured for the terminal 110, to activate a DRX function of the terminal 110. The following steps are included.

S206. The base station 130 sends an RRC connection reconfiguration message to the terminal 110.

The RRC connection reconfiguration message includes a DRX configuration message, where the DRX configuration message is used to configure the DRX parameter of the terminal, and the DRX parameter is used to configure the DRX function of the terminal 110. The terminal 110 receives the RRC connection reconfiguration message, configures the DRX parameter of the terminal 110 based on the DRX configuration message in the RRC connection reconfiguration message, and then performs the following step S207:

S207. The terminal 110 feeds back an RRC connection reconfiguration complete message to the base station 130. The terminal 110 activates the DRX function of the terminal 110 based on the DRX parameter. The base station 130 receives the RRC connection reconfiguration complete message, and performs the following step S208:

S208. The base station 130 feeds back an initial context setup response message to the CN. The CN receives the initial context setup response message, and this indicates that context setup is complete. In this case, the setup of the default bearer is completed, and the terminal 110 may initiate a Session Initiation Protocol (SIP), to initiate a voice call. The steps shown in dashed lines in the figure are all SIP signaling procedures, and the following step S209 is performed:

S209. The terminal 110 sends, to the CN through the base station 130, invite signaling for calling the terminal 120, to initiate a SIP call procedure. Although the CN receives the invite signaling and knows that the terminal 110 is to call the terminal 120, there is no connection between the CN and the terminal 120. Therefore, the CN initiates paging to the terminal 120, and performs the following step S210:

S210. The CN sends a paging message to a terminating base station 140. The base station 140 receives the paging message, and performs the following step S211:

S211. The base station 140 forwards the paging message to the terminal 120. The terminal 120 receives the paging message and initiates an RRC connection setup process. The RRC connection setup process is similar to the foregoing steps S201 to S203, and includes S212 to S214. Then a process of setting up an initial context and a default bearer includes steps S215 to S219 that are similar to steps S204 to S208, and details are not described herein again.

It should be noted that, in an RRC connection reconfiguration process between the terminal 120 and the base station 140, the base station 140 configures a DRX parameter for the terminal 120, so that the terminal 120 activates a DRX function. To be specific, an RRC connection reconfiguration message in S217 includes a configuration message, to configure the DRX parameter of the terminal 120.

After setup of the context and the default bearer on the terminating side are completed, the following step S220 is performed:

S220. The CN forwards the invite signaling to the terminal 120 through the base station 140.

After receiving the invite signaling, the terminal 120 sends a response message to the CN (S221), where the response message is trying signaling, indicating that the terminal 120 has received the invite signaling. After receiving the invite signaling sent by the terminal 110, the CN sends a response message to the terminal 110 (S222), where the response message is trying signaling, indicating that the CN has received the invite signaling. A sequence of sending the two pieces of trying signaling is not limited in this application.

In this case, the CN may initiate a voice bearer setup process, and the process includes the following steps S223 to S226.

S223. The CN sends, to the base station 130, an evolved universal terrestrial radio access network (E-UTRAN) radio access bearer (RAB) setup request (E-RAB setup request) message, namely, an E-RAB setup request message. The E-RAB setup request message is used to trigger setup of a voice bearer between the CN and the terminal 110. After receiving the E-RAB setup request message, the base station 130 performs the following step S224.

It should be noted that, an E-RAB set up in this case is a dedicated bearer, and is a voice bearer carrying a voice service, for example, a bearer with a QoS class identifier (QCI) of 1.

S224. The base station 130 sends an RRC connection reconfiguration message to the terminal 110. The terminal 110 receives the RRC connection reconfiguration message, and configures the DRX parameter of the terminal 110 based on a DRX configuration message in the RRC connection reconfiguration message. Then the terminal sends an RRC connection reconfiguration complete message to the base station 130 (S225), and the base station 130 sends an E-RAB setup response message to the CN (S226) after receiving the RRC connection reconfiguration complete message.

Likewise, the CN may also trigger setup of a voice bearer between the CN and the terminal 120. Specific steps S227 to S230 are similar to steps S223 to S226, and details are not described herein again.

It should be noted that, a sequence of setting up the voice bearer of the terminal 110 and setting up the voice bearer of the terminal 120 is not limited in this embodiment.

Then the terminal 110 and the terminal 120 proceed to a SIP procedure. The terminal 120 notifies the terminal 110 of states of ringing, connected (referred to as 200 OK in terms of signaling), and the like by using SIP signaling, and after the terminal 110 performs an acknowledgement (ACK), the terminal 110 and the terminal 120 can have a voice call, as shown in the SIP and voice call procedure in FIG. 2.

In the foregoing embodiment, the DRX functions of the terminal 110 and the terminal 120 are activated when the default bearer is set up. Subsequently, downlink signaling received before a voice call is connected between the terminal 110 and the terminal 120 may be affected by the DRX function.

Figure 3:
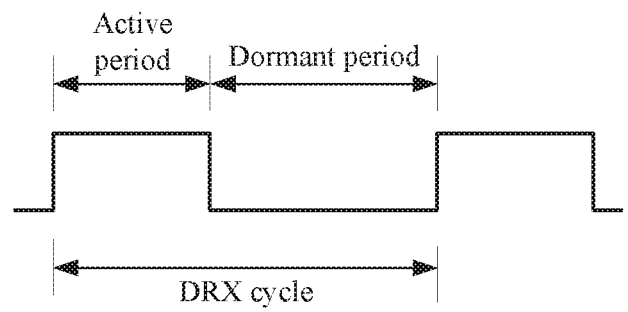
FIG. 3 is a schematic diagram of a DRX cycle according to an embodiment of this application.

The following describes impact of the DRX function on a voice call process with reference to a DRX cycle shown in FIG. 3. The DRX parameter configured by the base station includes the DRX cycle. In time domain, a time is divided into continuous DRX cycles. A DRX cycle includes an active period (On Duration) and a dormant period (also referred to as Opportunity for DRX). In the active period, the terminal listens on a PDCCH, so that the terminal may receive downlink data of the downlink channel. In the dormant period, the terminal does not listen on the PDCCH, and does not receive the downlink data of the downlink channel, to reduce power consumption.

With reference to FIG. 2, the DRX function of the terminal 110 is activated after step S206, and the DRX function of the terminal 120 is activated after step S217. The DRX function of the terminal 110 or the terminal 120 is always in a working state. If the downlink signaling arrives at a Packet Data Convergence Protocol (PDCP) buffer of the base station in the dormant period, the base station finds that the terminal 110 or the terminal 120 is in the dormant period, and cannot schedule the terminal 110 or the terminal 120 until the active period, consequently increasing a voice call connection delay. For the calling terminal, the downlink signaling may include the SIP signaling and RRC signaling, for example, the trying signaling in S222, or for another example, the RRC connection reconfiguration message in the foregoing step S224. For the called terminal, the downlink signaling may include the SIP signaling and the RRC signaling, for example, the invite signaling in S220, or for another example, the RRC connection reconfiguration message in the foregoing step S228.

That the terminal 110 and the terminal 120 in the idle mode make a voice call is merely used as an example for description. When the terminal 110 is in an RRC connected mode, the foregoing RRC connection setup process and default bearer setup process may be omitted. However, if the terminal 110 activates the DRX function when setting up the RRC connection and the default bearer because of another service, a voice call connection process is still affected by the DRX function. For example, the RRC connection reconfiguration message in the foregoing step S224 is affected by the DRX function. Likewise, the terminal 120 also faces the same problem if the terminal 120 is in the RRC connected mode.

In addition, to reduce ghost rings and voice missing at an answer moment, there may further be a precondition scheme in voice communication, and more SIP signaling is affected in the precondition scheme. In the precondition scheme, a resource is reserved for a current call before the call is set up, to prevent the ghost ring and an intermittent voice. The ghost ring means that at the moment when the called terminal starts to ring, a call is hung up due to a status such as an insufficient network resource. Voice missing means that an intermittent voice or voice missing occurs when the called terminal just starts to answer the call.

Figure 4:
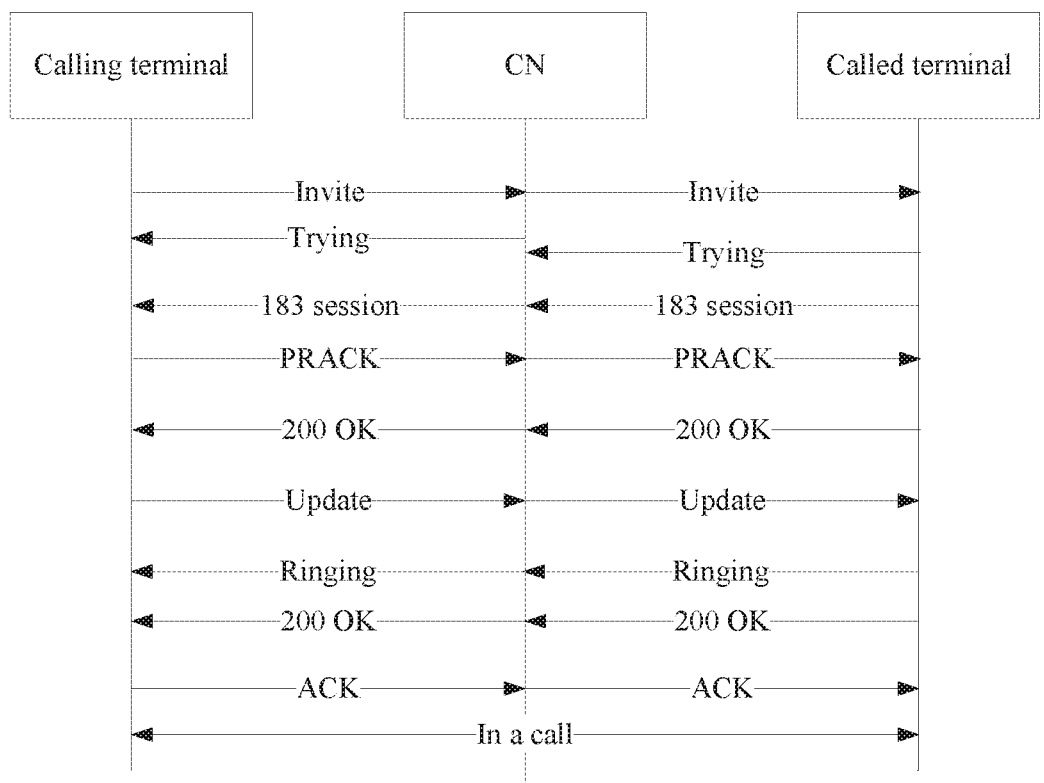
FIG. 4 is a flowchart of SIP signaling according to an embodiment of this application.

FIG. 4 is a flowchart of SIP signaling according to an embodiment of this application. As shown in FIG. 4, a calling terminal sends invite signaling to a called terminal through a CN. The CN receives the invite signaling sent by the calling terminal, and feeds back trying signaling, indicating that the invite signaling is received. The called terminal receives invite signaling sent by the CN, and feeds back trying signaling, indicating that the invite signaling is received.

The called terminal sends 183 session signaling to the CN, and the CN forwards the 183 session signaling to the calling terminal, where the signaling is used to indicate session setup progress information. In a non-precondition scheme, a dedicated bearer of the called terminal is set up for a voice bearer herein. The calling terminal feeds back, through the CN, a provisional response acknowledgement message, namely, PRACK signaling, indicating that the 183 session signaling is received. In the non-precondition scheme, the calling terminal sets up the dedicated bearer.

The called terminal sends 200 OK signaling to the calling terminal through the CN, indicating that a 183 session signaling request has been successfully processed. The calling terminal sends update signaling to the called terminal through the CN, to negotiate Session Description Protocol (SDP) information with the called terminal. The called terminal feeds back 200 OK signaling through the CN, indicating that an update request has been successfully processed. The called terminal rings, and sends ringing signaling to the calling terminal through the CN, indicating that the called terminal rings. The called terminal sends the 200 OK signaling to the calling terminal through the CN, indicating that an original invite request has been successfully processed. The calling terminal feeds back acknowledgement (ACK) signaling to the called terminal through the CN, to notify the called terminal that the calling terminal has known that the called terminal has successfully processed the invite request. In this case, a voice call may start.

In the non-precondition scheme, the SIP signaling (which may include or not include the 183 session signaling) after the 183 session is performed after voice bearers of the calling terminal and the called terminal are set up. In other words, the SIP signaling procedure in the steps in FIG. 2 includes the SIP signaling after the 183 session in FIG. 4. In a precondition scheme, these SIP procedures are performed before the voice bearer is set up, to reserve a resource for a call. Therefore, more downlink SIP signaling is affected by the DRX function. For example, for the called terminal, messages that may be affected include: invite signaling, PRACK signaling, and the like. In this case, if the update signaling is included during negotiation, and certainly the update signaling may not be included, the messages further include an RRC connection reconfiguration message, for setting up the voice bearer, that is not SIP signaling. For the calling terminal, messages that may be affected include: trying signaling, 183 session signaling, ringing signaling, 200 OK signaling, PRACK signaling, and the like, and further include an RRC connection reconfiguration message, for setting up the voice bearer, that is not SIP signaling. In view of this, an embodiment of this application provides a DRX management method.

Activating means that a DRX function of a terminal is not enabled before a voice bearer is set up, and is enabled only when the voice bearer is set up. For example, a base station does not activate the DRX function of the terminal when setting up a default bearer, and sends a DRX parameter until the voice bearer is set up, to activate the DRX function of the terminal. Alternatively, when the DRX function of the terminal has been enabled before the voice bearer is set up, the base station deconfigures the DRX function of the terminal to disable the DRX function of the terminal, and sends a DRX parameter to activate the DRX function of the terminal until the voice bearer is set up.

Figure 5:
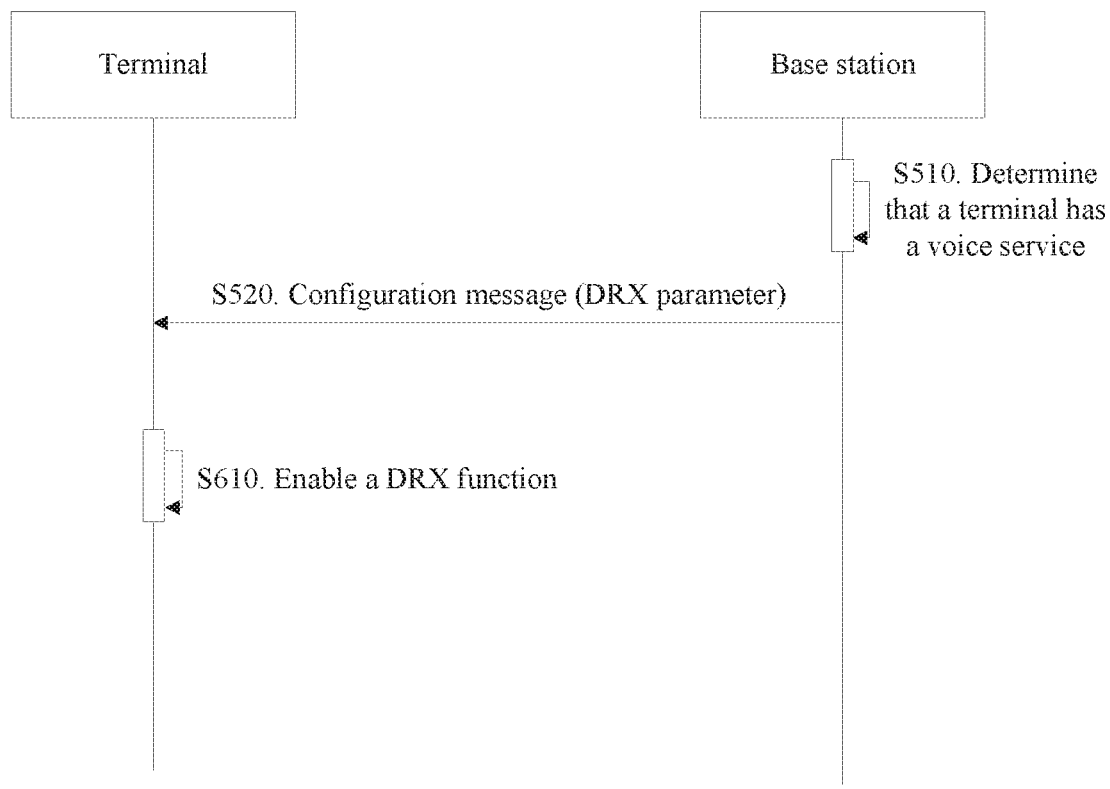
FIG. 5 is a flowchart of a DRX management method according to an embodiment of this application.

FIG. 5 is a flowchart of a DRX management method according to an embodiment of this application:

S510. A base station determines that a terminal has a voice service.

S520. The base station sets up a voice bearer for the terminal, and activates a DRX function of the terminal when setting up the voice bearer for the terminal. Specifically, the base station may send a configuration message to the terminal when determining that the terminal has a voice service, where the configuration message is used to configure the voice bearer for the terminal, and a DRX parameter is carried in the configuration message, to activate the DRX function of the terminal. The configuration message is, for example, an RRC connection reconfiguration message. The terminal receives the configuration message, and performs the following operations.

S530. The terminal enables the DRX function, and specifically, enables the DRX function based on a DRX parameter in a configuration message.

It can be learned that, according to the method in this embodiment of this application, the terminal does not activate the DRX function before setting up the voice bearer, and does not activate the DRX function until the voice bearer is set up, to reduce a voice call connection delay.

Optionally, the base station may not activate the DRX function of the terminal when setting up a default bearer for the terminal. This is especially applicable to a scenario in which before setting up the default bearer, the base station determines that the terminal has a voice service. In this case, when an RRC connection and the default bearer are set up because of a non-voice service, activation of the DRX function of the terminal is not affected, facilitating power saving of the terminal. Certainly, alternatively, the base station may not activate the DRX function of the terminal regardless of whether the terminal has a voice service when the default bearer is set up. In this case, complexity of management by the base station can be lowered. In addition, the DRX function is not activated only before the dedicated bearer is set up, and this has little impact on power saving of the terminal.

Figure 6:
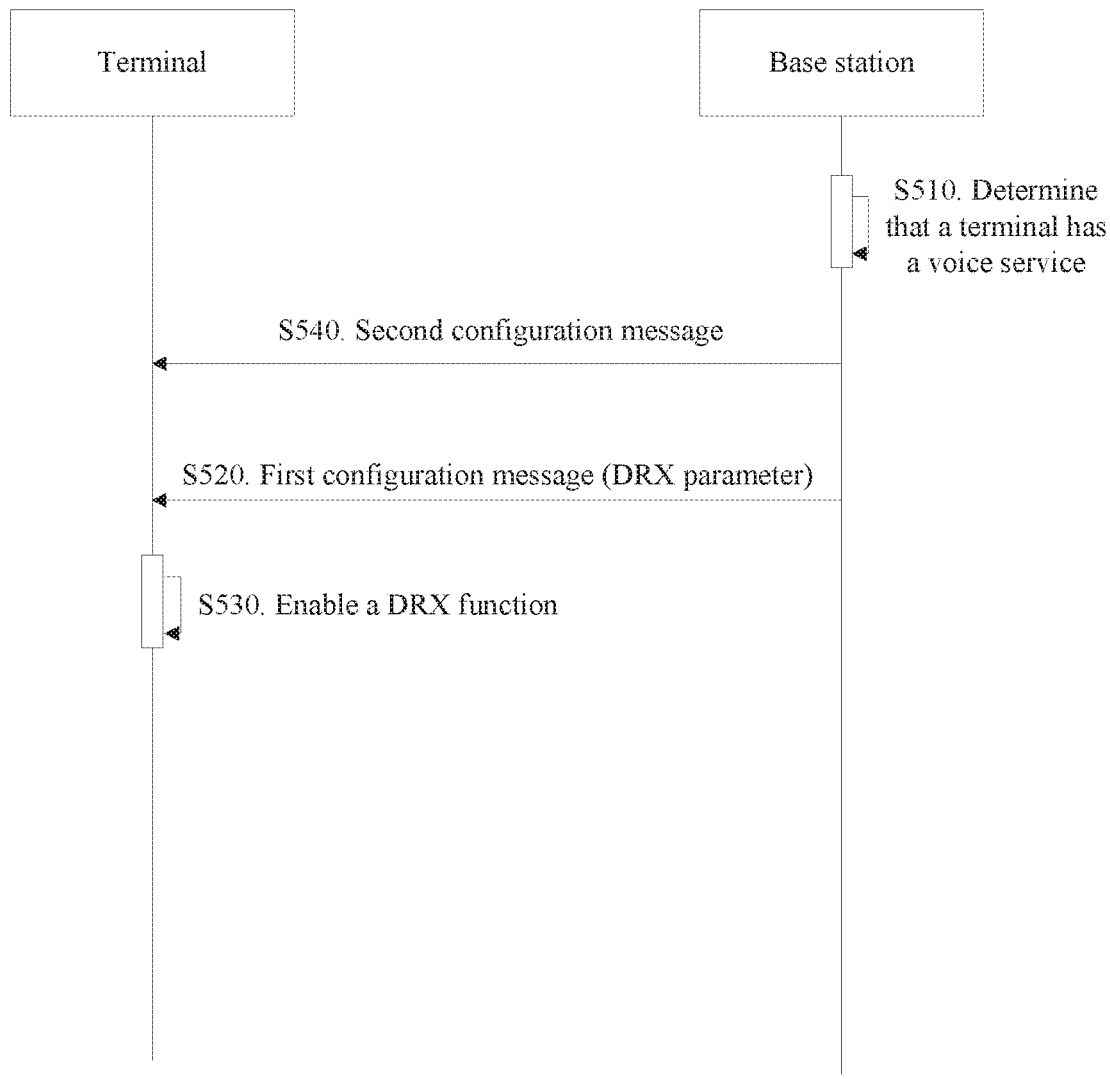
FIG. 6 is a flowchart of another DRX management method according to an embodiment of this application.

In this case, referring to FIG. 6, before the foregoing step S520, that is, before the base station sets up the voice bearer for the terminal, the method further includes:

S540. The base station sets up a default bearer for the terminal, and skips activating the DRX function of the terminal when setting up the default bearer for the terminal. Specifically, the base station may send a configuration message to the terminal when determining that the terminal has a voice service (for differentiation from the configuration message in step S520, where the configuration message in S520 is referred to as a first configuration message, the configuration message in S540 is referred to as a second configuration message). The second configuration message is used to configure the default bearer for the terminal, and the DRX parameter is not carried in the second configuration message, to not activate the DRX function of the terminal. The configuration message is, for example, an RRC connection reconfiguration message.

It should be noted that, a sequence between steps S530 and S510 is not limited. That the terminal has a voice service may be determined after the default bearer is set up, or the default bearer may be set up only after that the terminal has a voice service is determined.

In addition, before receiving the first configuration message sent by the base station, the terminal further receives the second configuration message sent by the base station (for example, the configuration message in step S206 in FIG. 2), where the second configuration message is used to configure the default bearer of the terminal, and the second configuration does not include the DRX parameter. In this way, the terminal does not enable the DRX function when the default bearer is set up.

Figure 7:
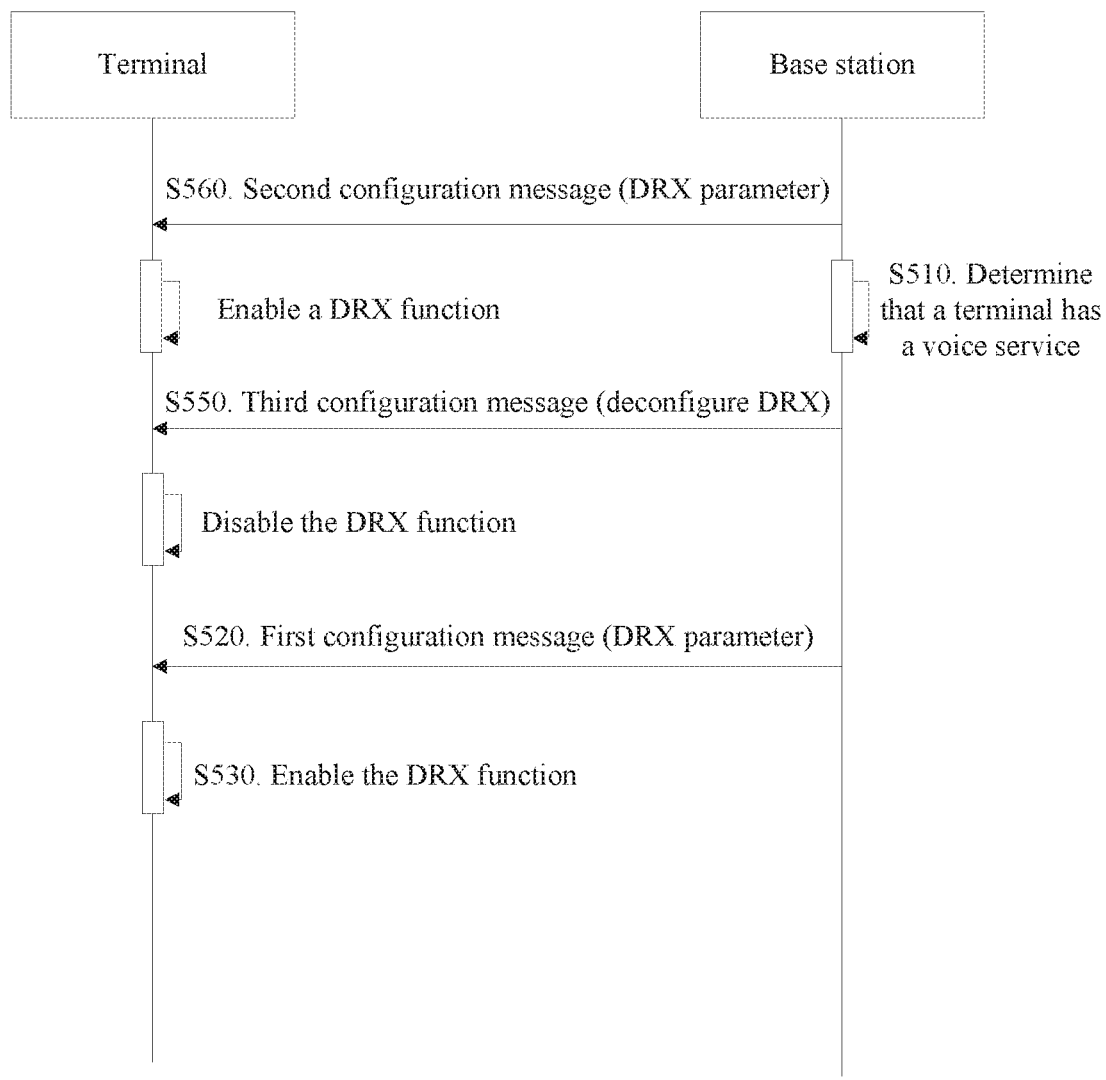
FIG. 7 is a flowchart of still another DRX management method according to an embodiment of this application.

Optionally, referring to FIG. 7, if the base station has activated the DRX function of the terminal before setting up the voice bearer, the method further includes:

S550. The base station sends a message for deactivating the DRX function of the terminal to the terminal. Specifically, the base station sends a configuration message (for differentiation from the foregoing configuration messages, the configuration message is referred to as a third configuration message) to the terminal, where the configuration message is used to deconfigure the DRX function of the terminal.

In this case, before receiving the first configuration message sent by the base station, the terminal further performs the following steps:

S560. The terminal receives a second configuration message (the configuration message in S206 in FIG. 2) sent by the base station, where the second configuration message is used to configure the default bearer of the terminal, and the second configuration message includes the DRX parameter.

S570. The terminal enables the DRX function based on the DRX parameter in the second configuration message.

S550. The terminal receives a third configuration message, where the third configuration message is used to deconfigure the DRX function of the terminal.

S580. The terminal deconfigures the DRX function based on the third configuration message.

In this way, although the terminal enables the DRX function when the default bearer is set up, the terminal disables the DRX function when the base station identifies that the terminal has a voice service, thereby mitigating impact of the DRX function on paging connection.

It can be learned that, even in a scenario in which the DRX function of the terminal has been activated before the voice bearer is set up, for example, the DRX function has been activated when the terminal initiates the RRC connection and sets up the default bearer due to a non-voice service, the base station can deactivate the DRX function when determining that the terminal has a voice service, so as to reduce a voice call connection delay by using the foregoing method.

In the foregoing step S520, that the base station activates the DRX function of the terminal may be implemented by adding, in an RRC connection reconfiguration process, the DRX parameter to the RRC connection reconfiguration message to be sent to the terminal. Because the DRX function of the terminal is not activated when the RRC connection reconfiguration message is sent, sending and reception of the RRC connection reconfiguration message are not affected by the DRX function, ensuring low-delay setup of the voice bearer, and reducing a voice call connection delay.

Similarly, in the foregoing step S540, that the base station skips activating the DRX function of the terminal when setting up the default bearer for the terminal may be implemented, by not adding, in the RRC connection reconfiguration process, the DRX parameter to the RRC connection reconfiguration message to be sent to the terminal.

In the foregoing step S550, that the base station sends the message for deactivating the DRX function of the terminal to the terminal may be implemented by adding, in the RRC connection reconfiguration process, a DRX parameter release information element to the RRC connection reconfiguration message to be sent to the terminal.

It should be noted that, the DRX parameter or the DRX parameter release information element is carried in the RRC connection reconfiguration message, and this application is not limited thereto. The DRX parameter or the DRX parameter release information element may alternatively be carried in another message. In other words, a message carrying the DRX parameter is not limited in this application.

In the foregoing step S510, the base station can determine, in a plurality of methods, that the terminal has a voice service.

In one method, referring to FIG. 2, when receiving an RRC connection request message sent by the terminal, the base station can determine, based on a cause value carried in the RRC connection request message, whether the terminal has a voice service. In this case, the foregoing step S510 may include the following steps.

The base station receives the RRC connection request message sent by the terminal, where the RRC connection request message includes the cause value, and the cause value is used to indicate a cause for initiating the RRC connection request.

S520. The base station determines, based on the cause value, that the terminal has a voice service.

For example, as shown in FIG. 2, when the calling terminal 110 in an idle mode initiates an RRC connection setup request, and the cause value carried in the RRC connection setup request is a voice call mobile originator, such as mo-VoiceCall, where mo is an acronym of mobile original, the base station determines, based on the cause value, that the terminal is a calling terminal, that is, determines that the terminal has a voice service.

For another example, when the called terminal 120 in an idle mode initiates an RRC connection setup request, and a cause value carried in the RRC connection setup request is a voice call mobile terminator, such as mt-VoiceCall, where mt is an acronym of mobile terminated, the base station determines, based on the cause value, that the terminal is a called terminal, that is, determines that the terminal has a voice service. It should be noted that the cause value herein is merely an example, and a specific form of the cause value is not limited.

It can be learned that, according to the method shown in FIG. 5, referring to FIG. 2, when the terminal initiates an RRC connection, the base station determines, based on the cause value, whether the terminal has a voice service, and then may not activate the DRX function of the terminal when the default bearer is set up, but activates the DRX function of the terminal only when the voice bearer is set up. In this way, impact of the DRX function of the terminal on a voice call is mitigated, and a voice paging connection delay is reduced.

In another method, when the called terminal is being paged, indication information may be added to a paging message, to indicate that the terminal has a voice service, or indicate that the terminal is a called terminal. The indication information may be a separately specified information element, or may be a paging priority. The base station and a CN have made an agreement in advance that the paging priority is used to indicate that the terminal has a voice service, or indicate that the terminal is a voice terminal.

When the paging priority is used to identify that the terminal has a voice service, an agreement can be made that a specific paging priority is used to indicate that the terminal has a voice service, or that the terminal is a called terminal.

Specifically, an agreement may be made through configuration. To be specific, a paging priority with a consistent configuration in the base station and the CN is used to indicate that the terminal has a voice service, or the terminal is a called terminal. In this case, referring to FIG. 2, when paging the called terminal 120, the CN adds the paging priority to the paging message. When receiving the paging message and finding that the paging priority carried in the paging message is consistent with a paging priority that is configured on the base station and that is used to indicate that the terminal has a voice service (or the terminal is a called terminal), the base station 140 considers that the terminal has a voice service or is a called terminal. Specifically, when learning, through parsing, that the paging message includes the paging priority, the base station may store an identifier of the terminal, for example, an SAE-temporary mobile subscriber identity (S-TMSI), where SAE is an acronym of System Architecture Evolution. In addition, when the terminal initiates the RRC connection request, the base station obtains the identifier of the terminal from the RRC connection request message. A terminal whose identifier is consistent with a locally stored identifier of the terminal is considered as a called terminal or a terminal that has a voice service. In this way, the base station may identify that the terminal has a voice service, do not activate the DRX function when setting up the default bearer for the terminal, and activate the DRX function when setting up the voice bearer.

When the separately specified information element is used to identify that the terminal has a voice service, the information element may be a voice terminal indication information element, and may be, for example, a VoLTE user indication in LTE. Herein, an example is merely used, and a name and a form of the information element are not limited. Referring to FIG. 2, when paging the called terminal 120, the CN adds the voice terminal indication information element to the paging message. When receiving the paging message and finding the voice terminal indication information element carried in the paging message, the base station 140 considers that the terminal has a voice service or is a called terminal. Specifically, when learning, through parsing, that the paging message includes the voice terminal indication information element, the base station stores an identifier of the terminal, for example, an S-TMSI. In addition, when the terminal initiates the RRC connection request, the base station obtains the identifier of the terminal from the RRC connection request message. A terminal whose identifier is consistent with a locally stored identifier of the terminal is considered as a called terminal or a terminal that has a voice service. In this way, the base station may identify that the terminal has a voice service, do not activate the DRX function when setting up the default bearer for the terminal, and activate the DRX function when setting up the voice bearer.

In this case, the method for determining, by the base station, that the terminal has a voice service includes: parsing, by the base station, the paging message of the terminal, and storing the identifier of the terminal when the paging message includes the indication information, receiving, by the base station, the RRC connection request message sent by the terminal, where the RRC connection request message includes the identifier of the terminal, and when the identifier stored by the base station is consistent with the identifier in the RRC connection request message, determining, by the base station, that the terminal has a voice service, or determines that the terminal is a called terminal.

In still another method, whether the terminal has a voice service may be identified in an initial context setup process. For example, an indication information element is added to an initial context setup request message, and the indication information element is used to indicate that the terminal has a voice service. In an initial context setup process on an originating side, the indication information element may be further used to indicate that the terminal is a calling terminal, and in an initial context setup process on a terminating side, the indication information element may be further used to indicate that the terminal is a called terminal. Referring to FIG. 2, the indication information element may be added to the initial context setup request message in step S205 on the originating side. The indication information element may be added to the initial context setup request message in step S216 on the terminating side. In this way, when receiving the initial context setup request message, the base station determines, based on the indication information element in the initial context setup request message, that the terminal has a voice service.

It can be learned that, in the method for determining that the terminal has a voice service, before or when setting up the default bearer, the base station may determine that the terminal has a voice service. Therefore, the base station may not activate the DRX function of the terminal when setting up the default bearer, and activates the DRX function of the terminal when setting up the voice bearer.

Referring to FIG. 2, when determining that the terminal 110 has a voice service, the base station 130 does not configure the DRX parameter of the terminal 110 in step S206, but configures the DRX parameter of the terminal 110 in step S224. When determining that the terminal 120 has a voice service, the base station 140 does not configure the DRX parameter of the terminal 120 in step S217, but configures the DRX parameter of the terminal 120 in step S228. Impact of the DRX function of the terminal on voice call connection can be mitigated by delaying activating the DRX function of the terminal, and a voice call connection delay is reduced.

In conclusion, according to any one of the foregoing methods for determining that the terminal has a voice service, after determining that the terminal has a voice service, the base station delays activating the DRX function of the terminal, thereby reducing a voice paging connection delay.

In yet another method, the base station may identify, by parsing a message on the default bearer, whether the terminal has a voice service. For example, after setting up the default bearer, the base station parses a data packet on the default bearer, finds, through parsing, that SIP signaling is carried on the default bearer, and determines that the terminal has a voice service. The method can be applied in any voice call scenario, and has a better effect in a scenario in which the terminal in an RRC connected mode initiates a voice service or serves as a voice called party. For example, an RRC connection and a default bearer are set up for the terminal because of a non-voice service, and in this case, the DRX function of the terminal has been activated. When determining that the terminal has a voice service, the base station may deactivate the DRX function of the terminal by using the method shown in FIG. 7, for example, send the RRC connection reconfiguration message, to release a DRX configuration. The base station activates the DRX function when setting up the voice bearer, and delivers the DRX parameter.

It should be noted that the default bearer in the foregoing embodiments includes a bearer with a QCI of 5 when the terminal has a voice service, and the voice bearer is a dedicated bearer and includes a bearer with a QCI of 1.

In addition, the DRX parameter used for the DRX function that is activated when the voice bearer is set up meets a characteristic of voice communication, and therefore, there is little impact on subsequent voice communication.

Figure 8:
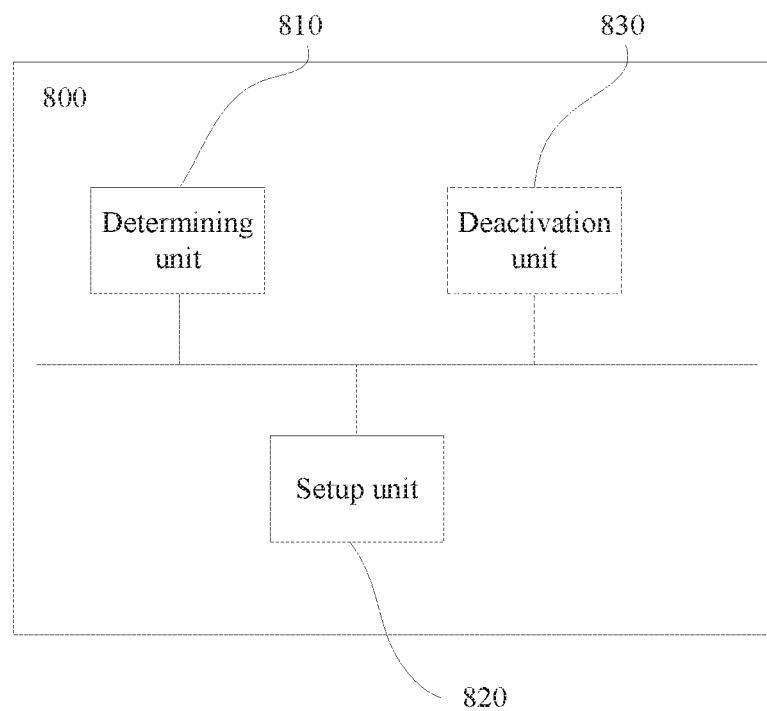
FIG. 8 is a schematic diagram of a DRX management apparatus according to an embodiment of this application.

The method performed by the base station in any one of the foregoing embodiments may be implemented by using a DRX management apparatus 800 shown in FIG. 8. The apparatus includes a determining unit 810 and a setup unit 820.

The determining unit 810 is configured to determine that a terminal has a voice service.

The setup unit 820 is configured to: set up a voice bearer for the terminal, and activate a DRX function of the terminal when setting up the voice bearer for the terminal.

It can be learned that, according to the foregoing apparatus 800, activation of the DRX function of the terminal can be delayed, thereby reducing a voice call connection delay.

Optionally, the setup unit 820 is further configured to: set up a default bearer for the terminal before setting up the voice bearer for the terminal, and skip activating the DRX function of the terminal when setting up the default bearer for the terminal.

Optionally, when the setup unit 820 has activated the DRX function of the terminal before setting up the voice bearer, the apparatus further includes: a deactivation unit 830, configured to send a message for deactivating the DRX function of the terminal to the terminal.

It can be learned that, even in a scenario in which the DRX function of the terminal has been activated before the voice bearer is set up, a voice call connection delay can be reduced by using the foregoing apparatus 800.

In the foregoing apparatus 800, the setup unit 820 may activate the DRX function of the terminal by sending a configuration message to the terminal. The configuration message is used to configure the voice bearer of the terminal, and the configuration message includes a DRX parameter.

It should be noted that, the configuration message may be an RRC connection reconfiguration message, or may be another message. A form of the configuration message is not limited herein.

In the foregoing apparatus 800, a manner of determining, by the determining unit 810, whether the terminal has a voice service is similar to the description of the foregoing method embodiment, and details are not described herein again.

It should be understood that division of the units of the foregoing apparatus is merely division of logical functions. In actual implementation, all or some of the units may be integrated into a physical entity, or may be physically separated. In addition, the units may all be implemented in a form of software invoked by using a processing element, or may be all implemented in a form of hardware. Alternatively, some units may be implemented in a form of software invoked by using a processing element, and some units may be implemented in a form of hardware. For example, the determining unit 810 may be a separately arranged processing element, or may be integrated into a chip of the base station, or may be stored in a memory of the base station in a form of program code, and invoked by using a processing element of the base station to perform a function of the determining unit. Implementation of another unit is similar to that of the determining unit. In addition, some or all of the units may be integrated or may be implemented separately. The processing element herein may be an integrated circuit having a signal processing capability. In an implementation process, the steps of the method or the foregoing units may be implemented by an integrated logic circuit of hardware in the processor element, or by a processing element invoking an instruction in a form of software.

For example, the units may be configured as one or more integrated circuits that perform the foregoing method, for example, one or more application-specific integrated circuits (ASIC), or one or more microprocessors (digital signal processors, DSPs), or one or more field programmable gate arrays (FPGAs). For another example, when one of the foregoing units is implemented in a form of invoking program code by a processing element, the processing element may be a general purpose processor, for example, a central processing unit (CPU), or another processor that can invoke the program code. For another example, the units may be integrated and implemented in a form of a system-on-a-chip (SOC).

Figure 9:
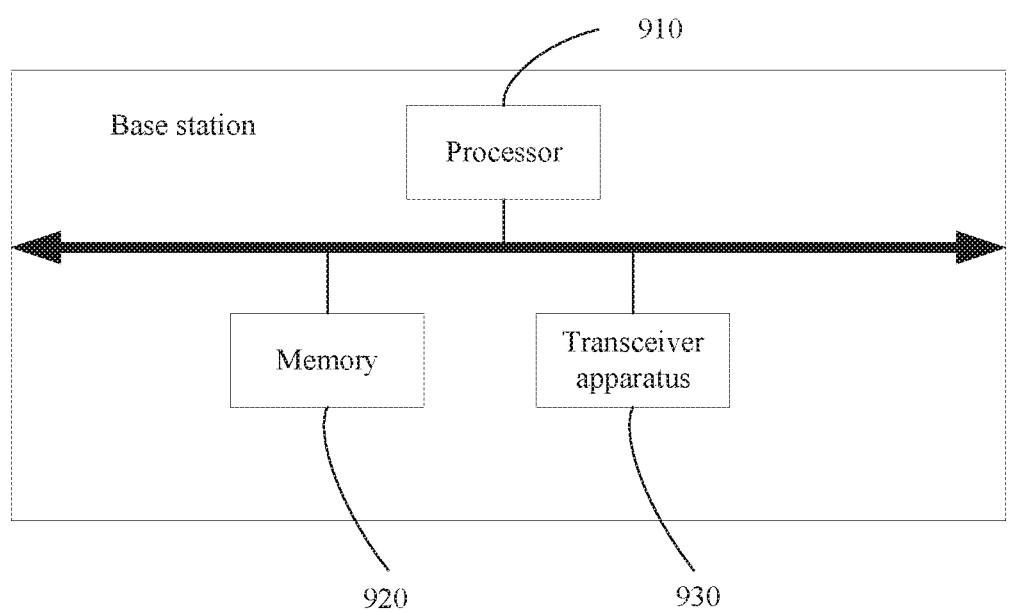
FIG. 9 is a schematic structural diagram of a base station according to an embodiment of this application.

FIG. 9 is a schematic structural diagram of a base station according to an embodiment of this application. As shown in FIG. 9, the base station includes: a processor 910, a memory 920, and a transceiver apparatus 930. The transceiver apparatus 930 may be connected to an antenna. The memory 920 is configured to store program code of the units for implementing the foregoing method embodiments or apparatus embodiments. The processor 910 invokes the program code, to perform operations of the base station in the foregoing method embodiments.

Figure 10:
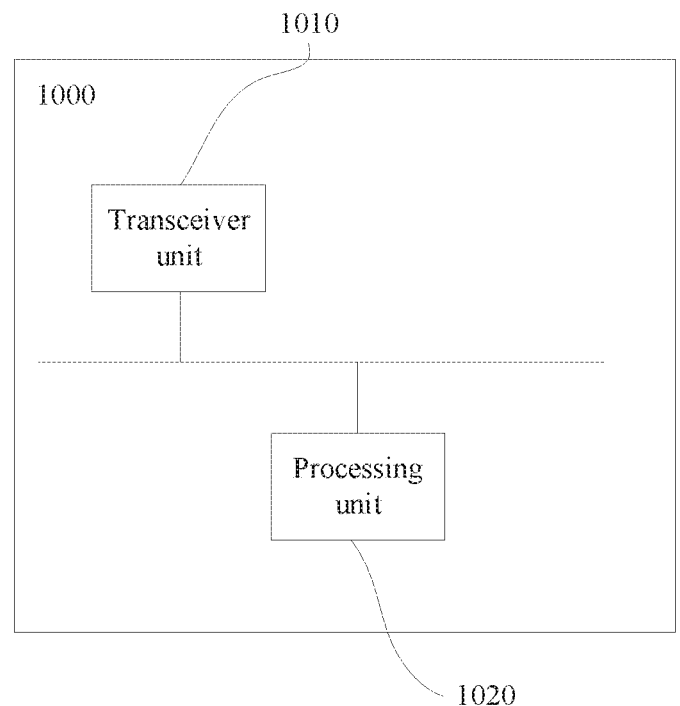
FIG. 10 is a schematic diagram of another DRX management apparatus according to an embodiment of this application.

The method performed by the terminal in any foregoing embodiment may be implemented by using a DRX management apparatus woo shown in FIG. 10. The apparatus includes a transceiver unit 1010 and a processing unit 1020. The transceiver unit 1010 is configured to receive a first configuration message sent by a base station, where the first configuration message is used to configure a voice bearer of the terminal, and the first configuration message includes a DRX parameter. The processing unit 1020 is configured to enable a DRX function based on the DRX parameter.

Optionally, before receiving the first configuration message sent by the base station, the transceiver unit 1010 is further configured to receive a second configuration message sent by the base station, where the second configuration message is used to configure a default bearer of the terminal, and the second configuration message does not include the DRX parameter. In this way, the terminal does not enable the DRX function when the default bearer is set up.

Optionally, before receiving the first configuration message sent by the base station, the transceiver unit 1010 is further configured to receive a second configuration message sent by the base station, where the second configuration message is used to configure a default bearer of the terminal, and the second configuration message includes the DRX parameter. The processing unit 1020 enables the DRX function based on the DRX parameter in the second configuration message. The transceiver unit 1010 is further configured to receive a third configuration message, where the third configuration message is used to deconfigure the DRX function of the terminal. The processing unit 1020 is configured to deconfigure the DRX function based on the third configuration message.

In this way, although the terminal enables the DRX function when the default bearer is set up, the terminal disables the DRX function when the base station identifies that the terminal has a voice service, thereby mitigating impact of the DRX function on paging connection.

Optionally, the transceiver unit 1010 is further configured to add, in an idle mode, a cause value when sending an RRC connection request to the base station, where the cause value is used to indicate a cause for initiating the RRC connection request, so that the base station determines, based on the cause value, that the terminal has a voice service. Further, when the terminal is a calling terminal, the cause value is a voice call mobile originator, such as mo-VoiceCall, when the terminal is a called terminal, the cause value is a voice call mobile terminator, such as mt-VoiceCall.

The foregoing transceiver unit may be a transceiver apparatus of the terminal, and the processing unit may be a processor of the terminal.

Figure 11:
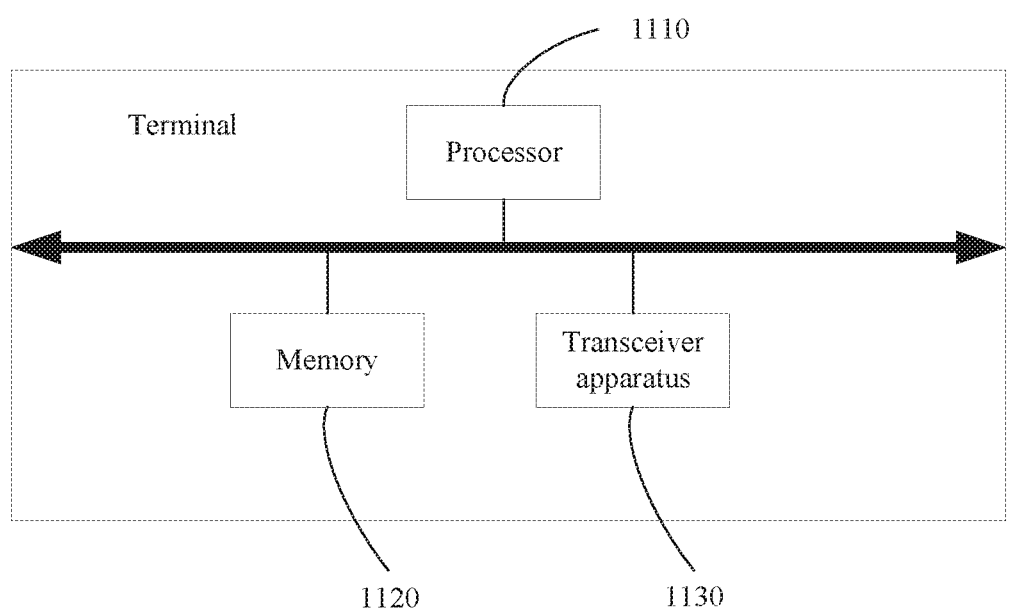
FIG. 11 is a schematic structural diagram of a terminal according to an embodiment of this application.

FIG. 11 is a schematic structural diagram of a terminal according to an embodiment of this application. As shown in FIG. 11, the terminal includes: a processor 1110, a memory 1120, and a transceiver apparatus 1130. The transceiver apparatus 1130 may be connected to an antenna. The memory 1120 is configured to store program code of the units for implementing the foregoing method embodiments or apparatus embodiments. The processor 1110 invokes the program code, to perform operations of the terminal in the foregoing method embodiments.

Based on descriptions of the foregoing embodiments, persons skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage, or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:
1. A discontinuous reception (DRX) management method, comprising:
  determining, by a base station, whether a first terminal has a first voice service based on a first message received by the base station, the first terminal having a deactivated first DRX function;

sending, by the base station to the first terminal, a third message to configure a first default bearer for the first terminal without activating the first DRX function of the first terminal;

in response to determining that the first terminal has the first voice service based on the first message received by the base station:
- setting up, by the base station, a first voice bearer for the first terminal; and
- activating, by the base station, the first DRX function of the first terminal during the setting up of the first voice bearer for the first terminal;

sending, by the base station to a second terminal, a fourth message to configure a second default bearer with a second DRX function;

determining, by the base station, whether the second terminal has a second voice service by parsing information on the second default bearer; and in response to determining that the second terminal has the second voice service by parsing the information on the second default bearer:
- sending, by the base station to the second terminal, a second message for deactivating the second DRX function of the second terminal;
- setting up, by the base station, a second voice bearer for the second terminal; and
- activating, by the base station, the second DRX function of the second terminal during the setting up of the second voice bearer for the second terminal.

2. The method according to claim 1, wherein the determining, by the base station, whether the first terminal has the first voice service comprises:
receiving, by the base station, a radio resource control (RRC) connection request message sent by the first terminal, the RRC connection request message comprising a cause value, and the cause value being used to indicate a cause for initiating an RRC connection request; and
determining, by the base station based on the cause value, that the first terminal has the first voice service.

3. The method according to claim 2, wherein the determining, by the base station based on the cause value, that the first terminal has the first voice service comprises:
in response to the cause value being a voice call mobile originator, determining, by the base station, that the first terminal has the first voice service; and
in response to the cause value being a voice call mobile terminator, determining, by the base station, that the first terminal has the first voice service.

4. The method according to claim 1, wherein the determining, by the base station, whether the first terminal has the first voice service comprises:
receiving, by the base station, a paging message of the first terminal from a core network, the paging message comprising indication information, and the indication information being used to indicate that the first terminal has the first voice service; and
determining, by the base station based on the indication information, that the first terminal has the first voice service.

5. The method according to claim 4, wherein the indication information is a paging priority, and the determining, based on the indication information, that the first terminal has the first voice service comprises:
in response to determining that the paging priority is a first paging priority, determining, by the base station, that the first terminal has the first voice service, the first paging priority being a specified paging priority used to indicate that the first terminal has the first voice service.

6. The method according to claim 4, wherein the indication information is a voice terminal indication information element, and the determining, by the base station based on the indication information, whether the first terminal has the first voice service comprises:
in response to determining that the paging message comprises the voice terminal indication information element, determining, by the base station, that the first terminal has the first voice service.

7. The method according to claim 1, wherein the determining, by the base station, whether the first terminal has the first voice service comprises:
receiving, by the base station, an initial context setup request message, the initial context setup request message comprising an indication information element, and the indication information element being used to indicate that the first terminal has the first voice service; and
determining, by the base station based on the indication information element, that the first terminal has the first voice service.

8. The method according to claim 1, wherein, in response to the base station setting up the second default bearer for the second terminal, the determining, by the base station, whether the second terminal has the second voice service comprises:
in response to determining that the information carried on the second default bearer is Session Initiation Protocol SIP signaling, determining, by the base station, that the second terminal has the second voice service.

9. A discontinuous reception (DRX) management apparatus, comprising:
at least one processor; and
a memory coupled to the at least one processor, wherein the at least one processor is configured to:
determine whether a first terminal has a first voice service based on a first message received by the apparatus, the first terminal having a deactivated first DRX function;
send, to the first terminal, a third message to configure a first default bearer for the first terminal without activating the first DRX function of the first terminal;
in response to determining that the first terminal has the first voice service based on the first message received by the apparatus:
set up a first voice bearer for the first terminal; and
activate the first DRX function of the first terminal during the setting up of the first voice bearer for the first terminal;
send, to a second terminal, a fourth message to configure a second default bearer with a second DRX function;
determine whether the second terminal has a second voice service by parsing information on the second default bearer; and
in response to determining that the second terminal has the second voice service by parsing the information on the second default bearer:
send, to the second terminal, a second message for deactivating the second DRX function of the second terminal;
set up a second voice bearer for the second terminal; and activate the second DRX function of the second terminal during the setting up of the second voice bearer for the second terminal.

10. The apparatus according to claim 9, wherein the at least one processor is further configured to:
receive a radio resource control (RRC) connection request message sent by the first terminal, wherein the RRC connection request message comprises a cause value, and the cause value is used to indicate a cause for initiating an RRC connection request; and
determine, based on the cause value, that the first terminal has the first voice service.

11. The apparatus according to claim 10, wherein the at least one processor is further configured to:
when the cause value is a voice call mobile originator, determine that the first terminal has the first voice service; and
when the cause value is a voice call mobile terminator, determine that the first terminal has the first voice service.

12. The apparatus according to claim 9, wherein the at least one processor is further configured to:
receive a paging message of the first terminal from a core network, wherein the paging message comprises indication information, and the indication information is used to indicate that the first terminal has the first voice service; and
determine, based on the indication information, that the first terminal has the first voice service.

13. The apparatus according to claim 12, wherein the at least one processor is further configured to:
when determining that a paging priority is a first paging priority, determine that the first terminal has the first voice service, wherein the first paging priority is a specified paging priority used to indicate that the first terminal has the first voice service.

14. The apparatus according to claim 12, wherein the indication information is a voice terminal indication information element, and the at least one processor is further configured to:
when determining that the paging message comprises the voice terminal indication information element, determine that the first terminal has the first voice service.

15. The apparatus according to claim 9, wherein the at least one processor is further configured to:
receive an initial context setup request message, wherein the initial context setup request message comprises an indication information element, and the indication information element is used to indicate that the first terminal has the first voice service; and
determine, based on the indication information element, that the first terminal has the first voice service.

16. A non-transitory computer-readable storage medium, storing:
a program, wherein when being executed by a processor, the following steps are performed:
determining whether a first terminal has a first voice service based on a first message received by the processor, the first terminal having a deactivated first DRX function;
sending, to the first terminal, a third message to configure a first default bearer for the first terminal without activating the first DRX function of the first terminal;
in response to determining that the first terminal has the first voice service based on the first message received by the processor:
setting up a first voice bearer for the first terminal; and
activating the first DRX function of the first terminal during the setting up of the first voice bearer for the first terminal;
sending, to a second terminal, a fourth message to configure a second default bearer with a second DRX function;
determining whether the second terminal has a second voice service by parsing information on the second default bearer; and
in response to determining that the second terminal has the second voice service by parsing the information on the second default bearer:
sending, to the second terminal, a second message for deactivating the second DRX function of the second terminal;
setting up a second voice bearer for the second terminal; and
activating the second DRX function of the second terminal during the setting up of the second voice bearer for the second terminal.

17. The method according to claim 1, wherein the base station performs the determining whether the first terminal has the first voice service before the sending, to the first terminal, the third message.

18. The method according to claim 1, wherein the base station performs the sending, to the first terminal, the third message before the determining whether the first terminal has the first voice service.

19. The apparatus according to claim 9, wherein the at least one processor is configured to perform the determining whether the first terminal has the first voice service before the sending, to the first terminal, the third message.

20. The apparatus according to claim 9, wherein the at least one processor is configured to perform the sending, to the first terminal, the third message before the determining whether the first terminal has the first voice service.

* * * * *